(12) United States Patent
Liechti (10) Patent No.: US 12,276,456 B2
(45) Date of Patent: Apr. 15, 2025

(54) GRAIN BYPASS FOR STORAGE BIN AND EXTERNAL AUGERS

(71) Applicant: Darrell Liechti, Carroll, IA (US)

(72) Inventor: Darrell Liechti, Carroll, IA (US)

( * ) Notice: Subject to any disclaimer, the term of this patent is extended or adjusted under 35 U.S.C. 154(b) by 299 days.

(21) Appl. No.: 17/661,603

(22) Filed: May 2, 2022

(65) Prior Publication Data

US 2022/0364790 A1 Nov. 17, 2022

Related U.S. Application Data (60) Provisional application No. 63/201,873, filed on May 17, 2021.

(51) Int. Cl.
*F26B 9/06* (2006.01)
*B65G 65/22* (2006.01)

(52) U.S. Cl.
CPC .............. *F26B 9/063* (2013.01); *B65G 65/22* (2013.01); *B65G 2201/042* (2013.01); *F26B 2200/06* (2013.01)

(58) Field of Classification Search
None
See application file for complete search history.

(56) References Cited

U.S. PATENT DOCUMENTS

| | | | | |
|---|---|---|---|---|
| 1,900,213 A * | 3/1933 | Wenberg | .............. | B65G 11/206 415/126 |
| 2,726,459 A * | 12/1955 | Morris | .................. | F26B 13/101 34/223 |
| 3,532,232 A | 10/1970 | Sukup | | |
| 3,946,496 A * | 3/1976 | Sukup | ..................... | F26B 25/22 414/161 |
| 5,447,404 A * | 9/1995 | Bjelkeby | .............. | B65G 65/466 414/213 |
| 5,468,122 A * | 11/1995 | Van Fossen | ............ | F26B 9/063 414/808 |
| 7,988,403 B2 * | 8/2011 | Ricketts | ............... | A01D 90/105 414/528 |
| 8,584,905 B2 * | 11/2013 | Thiessen | ................ | B65G 65/46 52/192 |
| 11,518,632 B2 * | 12/2022 | Pircon | .................. | B65G 69/181 |
| 11,618,636 B2 * | 4/2023 | Allegretti | ............... | B65G 65/44 198/530 |
| 11,712,006 B2 * | 8/2023 | Edlund | ..................... | F26B 3/06 34/443 |

(Continued)

FOREIGN PATENT DOCUMENTS

| CN | 211937819 U | * | 11/2020 |
|---|---|---|---|
| CN | 117262664 A | * | 12/2023 |
| JP | H05316871 A | * | 12/1993 |

*Primary Examiner* — Joseph A Dillon, Jr.
(74) *Attorney, Agent, or Firm* — McKee, Voorhees & Sease, PLC (57) ABSTRACT

A grain bypass can be retrofit to an out auger of a grain bin. This allows for the transfer of grain, such as corn, from the grain bin to a portable auger and/or truck or other type of transfer vehicle. The grain bypass can be configured to instead divert grain down a second bypass path so as to substantially cleanout the grain bypass housing. The grain bypass includes a slide that can be inserted into the grain bypass in two separate positions so that the slide can always be contained within the system, and thus remain with the system at all times.

14 Claims, 12 Drawing Sheets

(56) References Cited

U.S. PATENT DOCUMENTS

| | | | |
|---|---|---|---|
| 11,767,172 B2* | 9/2023 | Rauser | B65G 65/466 |
| | | | 414/310 |
| 11,878,880 B2* | 1/2024 | Alig | B65G 69/0441 |
| 2006/0018742 A1* | 1/2006 | Hook | B60P 1/42 |
| | | | 414/502 |
| 2008/0173521 A1* | 7/2008 | Hitch | B65G 15/44 |
| | | | 198/698 |

* cited by examiner

GRAIN BYPASS FOR STORAGE BIN AND EXTERNAL AUGERS

CROSS REFERENCE TO RELATED APPLICATIONS

This application claims priority under 35 U.S.C. § 119 to provisional patent application U.S. Ser. No. 63/201,873, filed May 17, 2021. The provisional patent application is herein incorporated by reference in its entirety, including without limitation, the specification, claims, and abstract, as well as any figures, tables, appendices, or drawings thereof.

FIELD OF THE INVENTION

The present invention relates generally to an apparatus and/or corresponding method of use in at least the agricultural industry. More particularly, but not exclusively, the present invention relates to a grain bypass between storage bins and external augers utilizing a slide for grain, such as corn.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Known grain drying bins typically include a foundation or slab supporting an upstanding circular wall having a conically shaped roof mounted thereon. An opening is formed in the apex of the roof for communicating the interior of the bin with the exterior. Often suspended above the slab by a plurality of supports is a perforated floor which supports the grain. The substantially open chamber formed between the floor and the slab distributes heated dry air forced into the chamber through a vent connected to a blower-furnace under the entire floor. The forced air then percolates upward through the floor and grain supported thereon, absorbing the moisture in the grain, and exits the bin through the opening provided in the roof.

Grain removing apparatuses have been implemented within the aforementioned grain drying bins to more fully remove grain from the grain drying bins. These grain removing apparatuses typically include several augers, which first engage and move grain at its distal or free end to the exclusion of grain positioned along its length. The distal end of the auger acts as a screw to fill the area between flightings of the auger. As the auger rotates, engaged material in the flightings is moved along the length of the auger. The length of the auger and number of revolutions in the screw portion can vary so as to best suit the intended application.

On example of a specific auger typically used in grain drying bins are sweep augers. Sweep augers are typically located on top of the perforated floor and radially extend from a centrally located hub. A rotating device within the hub causes the sweep augers to rotate about an axial axis extending through the hub. As a result, grain is fed inwardly within the bin.

Another example of an auger used in grain drying bins are discharge auger(s). Discharge augers fluidly connect the pit with the exterior of the bin. They are generally placed below a center of the perforated floor. The discharge auger engages and evacuates the grain in the pit to an exterior of the bin.

The sweep augers and discharge auger are typically interconnected by a drive unit operable to rotate the sweep augers about their own axes in response to rotation of the discharge auger. One such combination of a grain bin employing sweep augers and a discharge auger can be seen in U.S. Pat. No. 3,532,232.

Though these solutions have been effective at evenly evacuating grain from grain drying bins, they have yet to solve the problem of having to unload grain from a wet bin without going through the drying system. This is because the wet bin is filled with dry corn at the end of the drying season.

Thus, there exists a need in the art for an apparatus which does not require the corn to go through a dryer when sold or transferred out of a wet bin but instead is capable of dropping substantially all of the grain into a portable auger and/or transfer the grain into a wagon or truck while avoiding any run over.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to provide a self-contained and completely enclosed system that includes a guided slide. The guided slide can be inserted into the grain bypass in at least two distinct positions. The slide may thus always be kept with the system and can be guided into said positions using welded rods and/or rods that employ cotters. One or more rods can be welded to a single plate, such as a side plate, of the grain bypass system/housing. If more than one rods are employed, this can allow for a more stable configuration for the guided slide (e.g. the rods form a guided 'track') and/or the slide can be inserted into additional distinct positions that either permit partial flow through each of the sides of the grain bypass housing and/or speed up/slow down grain moving through one of the sides of the grain bypass housing.

It is still yet a further object, feature, and/or advantage of the present invention to transfer grain in a controlled manner, regardless of the moisture content in the grain.

It is still yet a further object, feature, and/or advantage of the present invention to be able to establish and/or maintain clean apparatuses in the grain bin, grain bypass assembly, in portable augers, and in transfer vehicles.

The grain bypass disclosed herein can be used in a wide variety of applications. For example, the grain bypass can move any suitable types of grain, including corn, teff, wheat, oats, rice, barley, sorghum, rye, millet, triticale, amaranth, buckwheat, quinoa, and the like. In still other applications, the grain bypass can be retrofit to accommodate out augers of any size, shape, and/or configuration.

It is preferred the apparatus be safe, cost effective, and durable. For example, a safety door can be employed and/or other mechanisms that will prevent the slide from slipping out of position during use.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and repair of a grain bypass which accomplishes some or all of the previously stated objectives.

The grain bypass can be incorporated into systems which accomplish some or all of the previously stated objectives.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Referring now to the figures, various components of the grain bypass are shown in detailed views through FIGS. 1-8.

Figure 1:
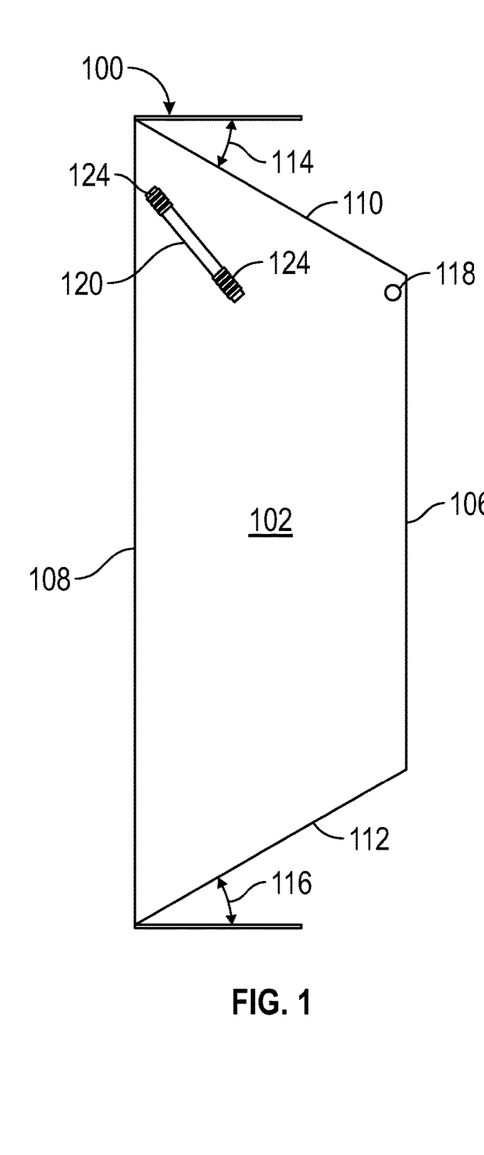
FIG. 1 shows an elevational internal side view of a left-side plate for a grain bypass, according to some aspects of the present disclosure.
Figure 2:
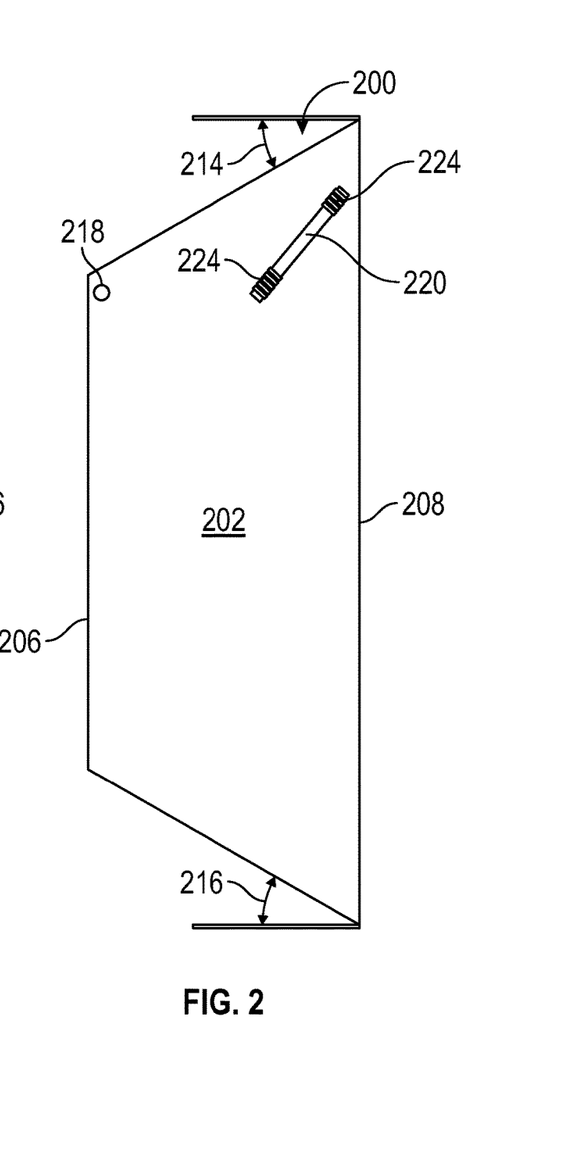
FIG. 2 shows an elevational internal side view of a right-side plate for a grain bypass, the right-side plate being shown as a substantially mirrored image of the left-side plate of FIG. 1, according to some aspects of the present disclosure.

FIGS. 1-2 show internal elevational views of side plates 100, 200 of the grain bypass. The side plates 100, 200 are preferably designed to mirror one another, though such a configuration is not required and some asymmetry can exist if the application permits. The side plates 100, 200 can thus be identically constructed and later deviate into left-side plate 100 and right-side plate 200 prior to attaching guide rods thereto.

In greater particularity, FIG. 1 shows the left-side plate 100 including an internal surface 102. An external surface 104 exists opposite the internal surface 102, though is not seen in FIG. 1 (see FIG. 14, discussed infra). The internal and external surfaces 102, 104 of the left-side plate 100 are shown having a symmetric, trapezoidal shape, though other two-dimensional shapes can be used if the application permits/requires. The internal and external surfaces 102, 104 are conterminously joined at rear (proximate) edge 106 and a front (distal) edge 108. The rear edge 106 acts as the short base of the trapezoid, and the front edge 108 acts as the long base of the trapezoid. The rear and front edges 106, 108 are connected by way of the legs of the trapezoid, upper and lower edges 110, 112, which form acute angles 114, 116 with the horizontal rather than normal angles (as in a rectangle). The grain bypass works best by at a lower acute angle 116 of approximately thirty degrees (30°). The severity of the angles 114, 116 can vary, through can be specifically chosen to give a maximum distance out for the available height within the grain bypass. The left-side plate 100 includes an aperture 118 for mounting the left-side plate 100 to the rest of the grain bypass (e.g., other components of the grain bypass housing and/or augers within the grain bypass system). The aperture 118, in a non-limiting example, can comprise a five-eights inch (⅝") diameter hole to allow rods and/or male threaded fasteners of a slightly smaller diameter to be slid therethrough.

As shown in FIG. 2, the right-side plate 200 includes substantially identical and/or similar components as left-side plate 100, but with the internal and external surfaces 202, 204 switched. The side plates 100, 200 are, in a preferred embodiment, field-cut to fit and welded into place on either side of the angled base plate adjoining the top plate 300 (see FIG. 3, discussed infra).

The side plates 100, 200 can integrally, be adapted to, and/or later be assembled to include one or more guides or tracks. One such example of said guides or tracks is shown in FIGS. 1-2 as a first rod 120, 220 welded via welds 124, 224. Second, optional rods (not shown) can be welded within the general proximity of the first rods 120, 220.

Figure 3:
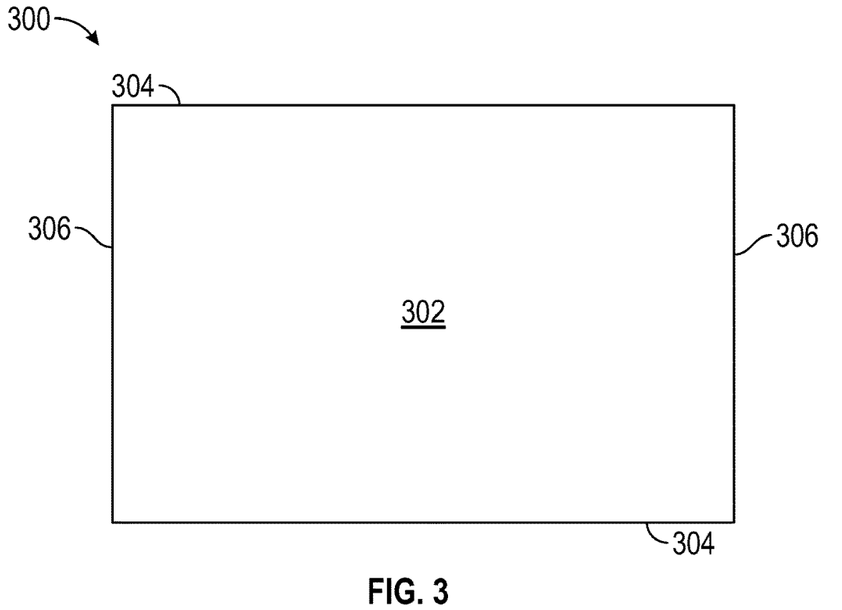
FIG. 3 shows a front elevational view of a top plate for a grain bypass, according to some aspects of the present disclosure.

As shown in FIG. 3, a top plate 300 can include a rectangular shape with contact surfaces 302 enclose by conterminous edges 304, 306. The upper and lower edges 304 of the top plate 300 in some embodiments are longer than the left- and right-side edges 306 of the top plate 300. More preferably, the upper and lower edges 304 of the top plate 300 are three-halves times the length of the length of the left- and right-side edges 306. The top plate 300 can be welded in place to the side plates 100, 200, other components of the grain bypass housing, and/or augers within the grain bypass system. In a preferred embodiment, The welds between the top plate 300 preferably can form hermetic seals so that no material and/or moisture passing through the grain bypass seeps through the grain bypass housing. In some other embodiments, the top plate 300 can be removably secured (such as via mechanical fasteners, such as screws, bolts 126/226, nuts, washers 128/228 clamps, and the like) to the side plates 100, 200, other components of the grain bypass housing, and/or augers within the grain bypass system. For example, the top plate 300 is welded in place to the side plates 100, 200 at a sixty degree)(60°) angle slightly above the top of the opening cut.

Figure 4:
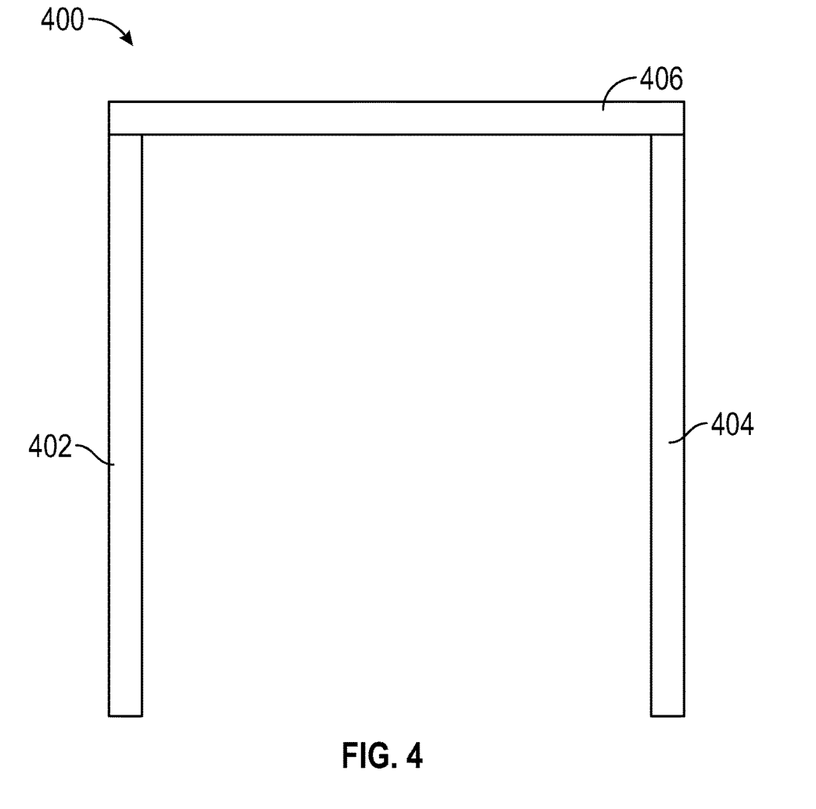
FIG. 4 shows a collection of rods usable with the grain bypass of the present invention(s), according to some aspects of the present disclosure.

As shown in FIG. 4, a collection 400 of rods 402, 404, 406 is shown. Said rods 402, 404, 406 can be welded to left- and right-side plates 100, 200 and used as guides for other plates and components of the grain bypass system. The rods 402, 404, 406 can, as an example, comprise cylindrical rods. The cylindrical rods 402, 404, 406, can be fixed or otherwise attached to one or more surfaces such that in an operating position, the rods 402, 404, 406 can be used to support a removable slide 600 (see FIG. 6, discussed infra) and/or other plate that is slid on top of same. The cylindrical rods 402, 404, 406 can, by way of non-limiting example, comprise a half-inch (½") diameter and be cut to a length of approximately nine inches (9") long.

Figure 5:
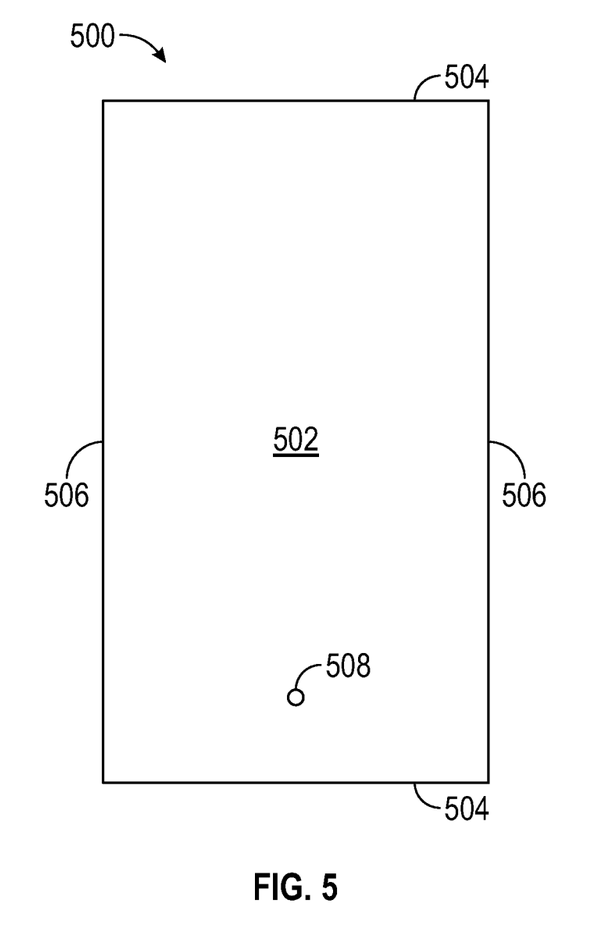
FIG. 5 shows a front elevational view of an angled base plate for a grain bypass, according to some aspects of the present disclosure.

As shown in FIG. 5, the angled base plate 500 can be of a rectangular shape and can comprise angled base plate contact surface(s) 502, the upper/lower edges 504, the left- and right-side edges 506, and a locking aperture 508. The upper/lower edges 504 of the angled base plate 500, in some embodiments, can be shorter than the left- and right-side edges 506. In some further embodiments, the upper/lower edges 504 can be approximately nine sixteenths (9/16) the length of the length of the left- and right-side edges 506. The locking aperture 508, in some embodiments, can be located approximately an inch from the lowermost edge 504 of the angled base plate 500 and adapted to as to receive a locking mechanism 510 (see FIGS. 9 and 15, discussed infra).

Figure 9:
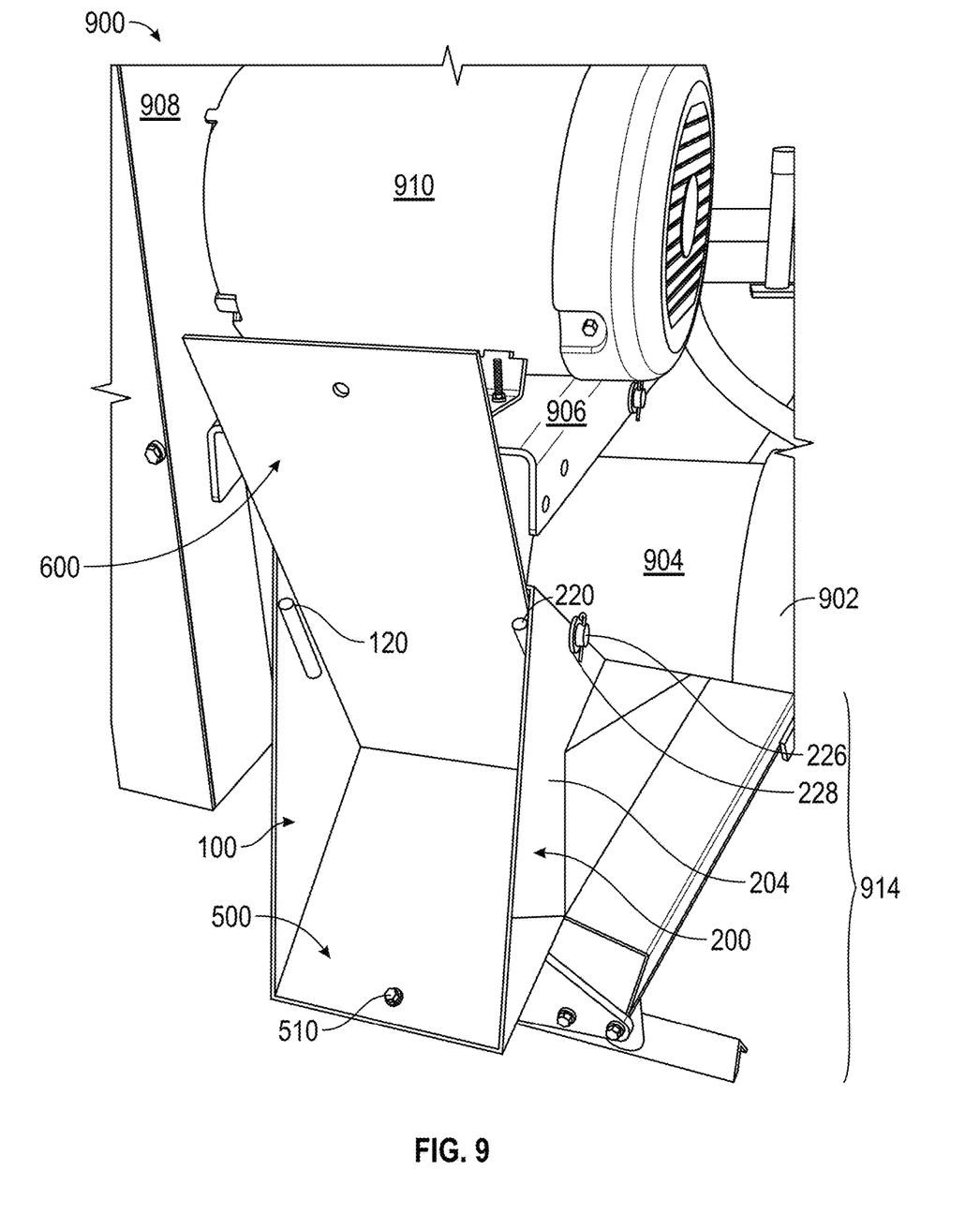
FIG. 9 shows a photographic view of an exemplary grain bypass in a 'closed' position and thus allows grain to flow into a transfer portion of the grain bypass housing and to a portable auger and/or truck for transport, rather than so as to allow grain to flow freely out of the housing through an opening on the opposite side of the transfer portion.

One or more rods 402, 404, and/or 406 can be welded in place flush from the top edge of the angled base plate 500 to inside of the out auger 902 which seals grain from going into an auger that moves grain to the dryer (see FIG. 9, discussed infra).

Like the top plate 300, the angled base plate 500 can be welded in place to the side plates 100, 200, other components of the grain bypass housing, and/or augers within the grain bypass system. The welds between the angled base plate 500 preferably form hermetic seals so that no material and/or moisture passing through the grain bypass seeps through the grain bypass housing. In some other embodiments, the angled base plate 500 can be removably secured (such as via mechanical fasteners, such as screws, bolts 226, nuts, washers 228 clamps, and the like) to the side plates 100, 200, other components of the grain bypass housing, and/or augers within the grain bypass system.

Figure 6:
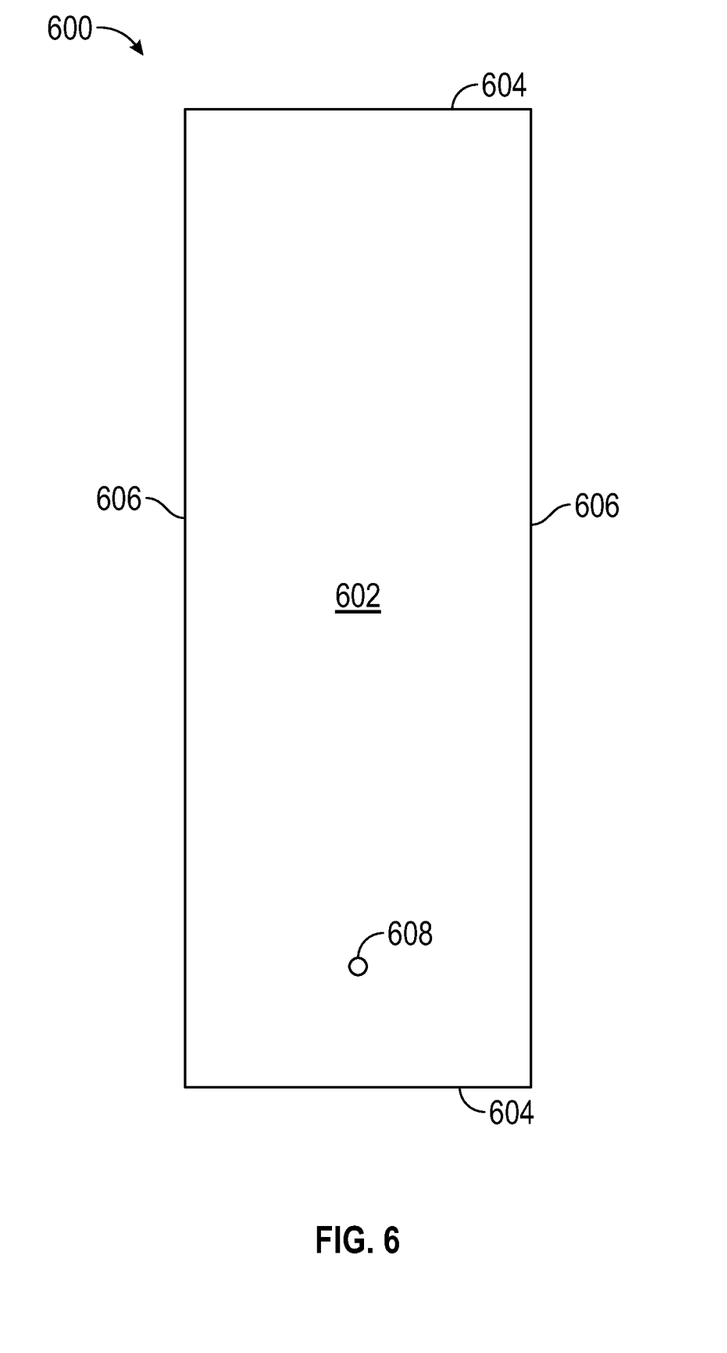
FIG. 6 shows a front elevational view of a slide for a grain bypass, according to some aspects of the present disclosure.

As shown in FIG. 6, the removable slide 600 can be of a rectangular shape and can comprise slide contact surface(s) 602, the upper/lower edges 604 of slide, the left- and right-side edges 606 of the slide, and a locking aperture 608. The upper/lower edges 604 of the removable slide 600, in some embodiments, can be shorter than the left- and right-side edges 606. In some further embodiments, the upper/lower edges 604 can be approximately one third (⅓) the length of the length of the left- and right-side edges 606. The materials of the removable slide 600 can be primed and painted for improving durability and/or aesthetics of the removable slide 600.

The locking aperture 608, in some embodiments, can be a five-sixteenths inch (5/16") diameter hole and located approximately between an inch (1") and three-halves inch (3/2") from the lowermost edge 604 of the removable slide 600 and adapted to as to receive the locking mechanism 510. The locking aperture 608 of the removable slide 600 is thus located so as to line up with the locking aperture 508 of the angled base plate 500 so that the locking mechanism 510 can extend through both and fasten both to each other while the slide 600 is an overlapping position with the angled base plate 500. In one embodiment, the locking mechanism 510 is a 5/16 inch bolt inserted into the apertures 508, 608 to keep the removable slide 600 in place during operation of the grain bypass.

Figure 7:
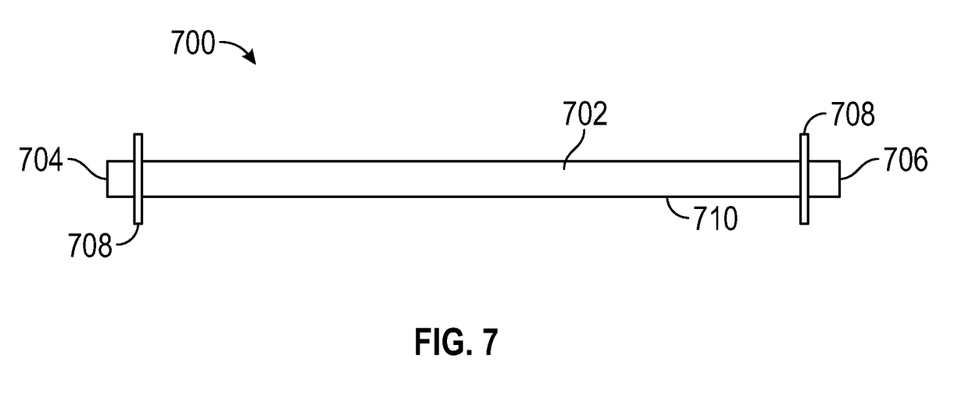
FIG. 7 shows a front elevational view of a rod with cotters, according to some aspects of the present disclosure.

As shown in FIG. 7, alternative rods 700 can be used in addition to and/or in lieu of welded rods 400. They can include cylindrical bodies 702, first and second ends 704, 706, cotters 708, and a circumferential surface 710. The cotters 708 are pins or wedges that can pass through holes to fix parts tightly together, and the angle of the wedge determines the position of the parts being held.

Figure 8:
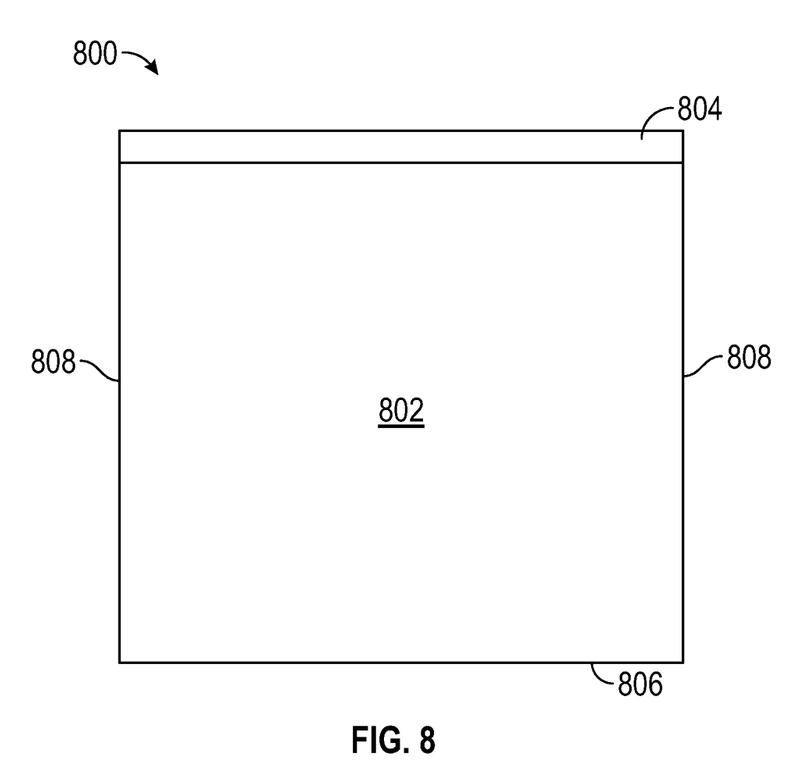
FIG. 8 shows a rear elevational view of a safety door, according to some aspects of the present disclosure.

As shown in FIG. 8, a safety door 800 comprises door body 802, a pipe 804, a blunt edge 806, and left- and right-side edges 808. The safety door 800 in some embodiments can comprise a square shape. In other embodiments, the left- and right-side edges 808 are just slightly longer than the length of the blunt edge 808 so that an orientation of the safety door 800 can be ascertained prior to installation. The safety door 800 in operation works to reduce grain splatter and deter rodents from entering the grain bypass. The safety door 800 can be put into place, and as an example, the cotter-type rods 700 welded into place on the slide plates 100, 200 so as to guide the slide 600. In one embodiment, the rods 700 are approximately three inches long so as to allow the safety door 800 to swing open and shut and to still allow grain to flow out. The safety door 800 is oriented such that gravity will act as a biasing mechanism to cause the safety door 800 to shut.

As shown in FIG. 9, the grain bypass in an operable position can divert the grain out the side of the out auger 902 opposite the dryer and drops it into a portable auger to transfer corn into a wagon or truck. The grain bypass housing 906 includes a receiving portion 904 that is cut directly into the out auger 902 and/or unloading auger that unloads grain from the grain bin 1400 (see FIG. 13, discussed infra). The slide 600 can be seen resting in a first position on the left-side plate first guide rod 120 and the right-side plate first guide rod 220 such that grain is not allowed to exit the opening that is covered by the safety door 800. Moreover, the slide 600 when in this first position supported by rods 120, 220 is located in front of and pushes the safety door 800 shut.

The bypass housing 906 and slide 600, in combination act as a bypass valve. Bypass valves are typically employed only in traditional fluid mechanics applications, and are thus unique in moving grain from an out auger 902 of a grain bin to a portable auger and/or truck for transportation.

Figure 10:
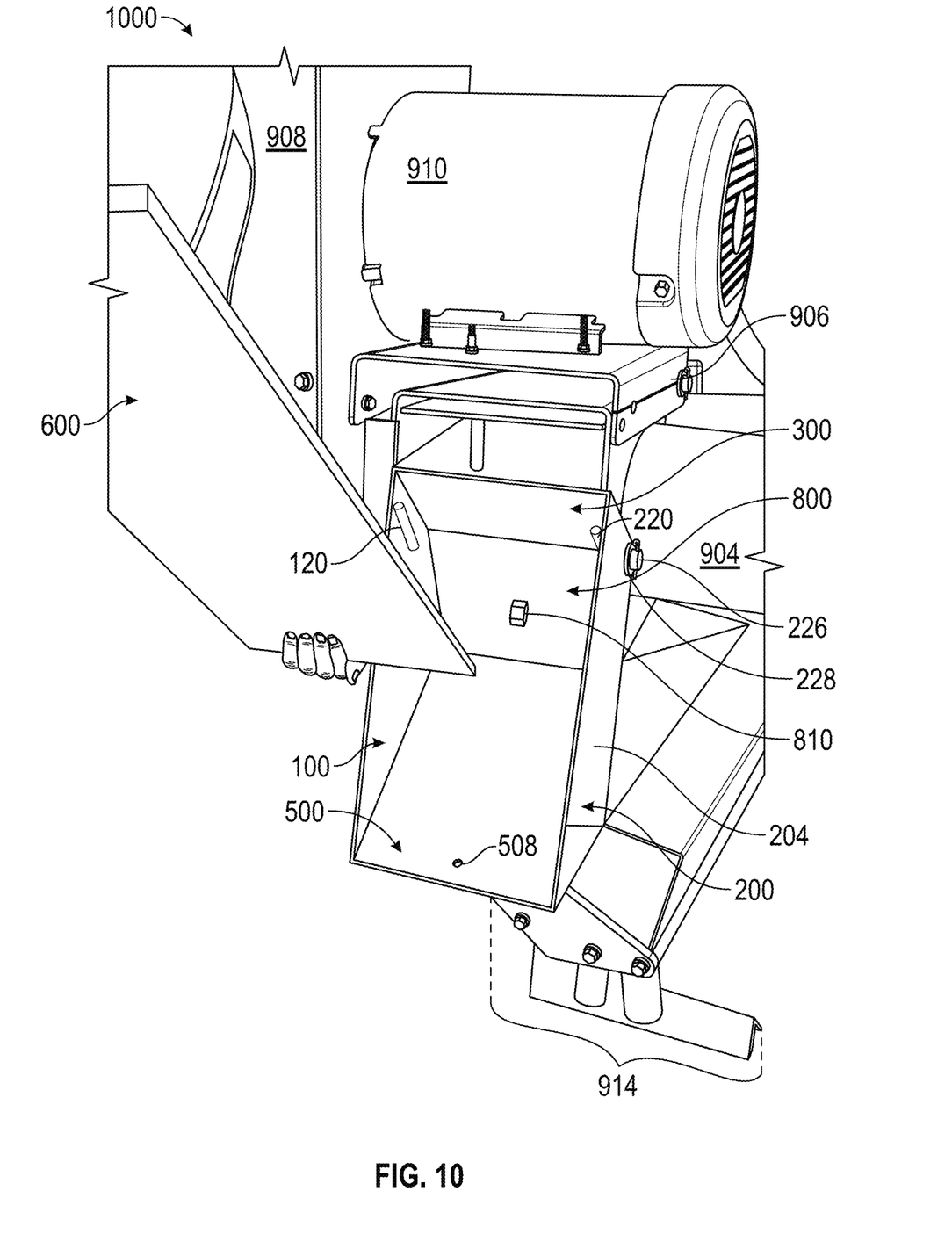
FIG. 10 shows a photographic view of the grain bypass of FIG. 9 with the slide removed and the safety door exposed, emphasizing the central peg and/or handle of the safety door.
Figure 11:
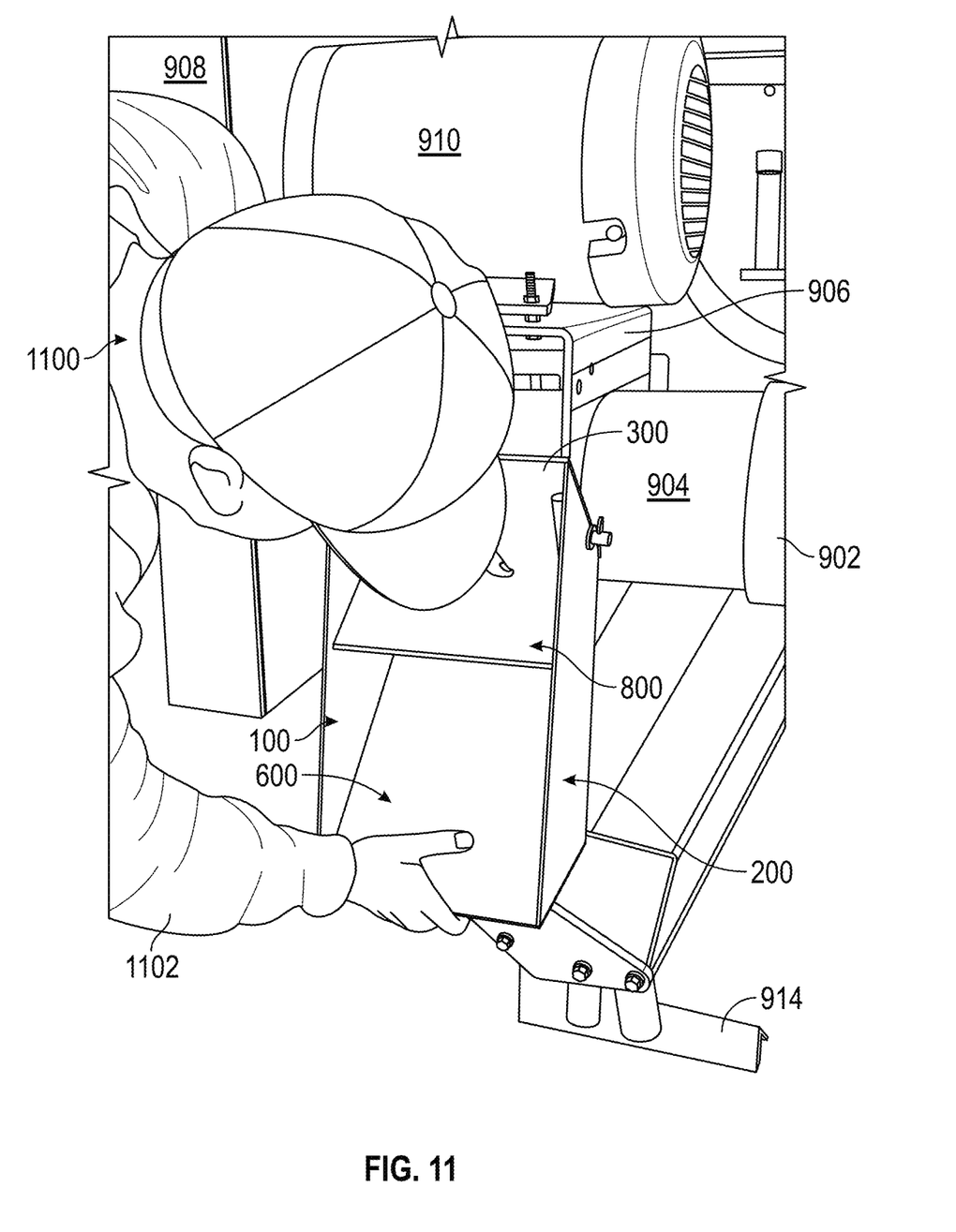
FIG. 11 shows a photographic view of an operator pulling on the central peg and/or handle of the safety door of FIG. 10 so as to allow the slide to be put into grain bypass housing.
Figure 12:
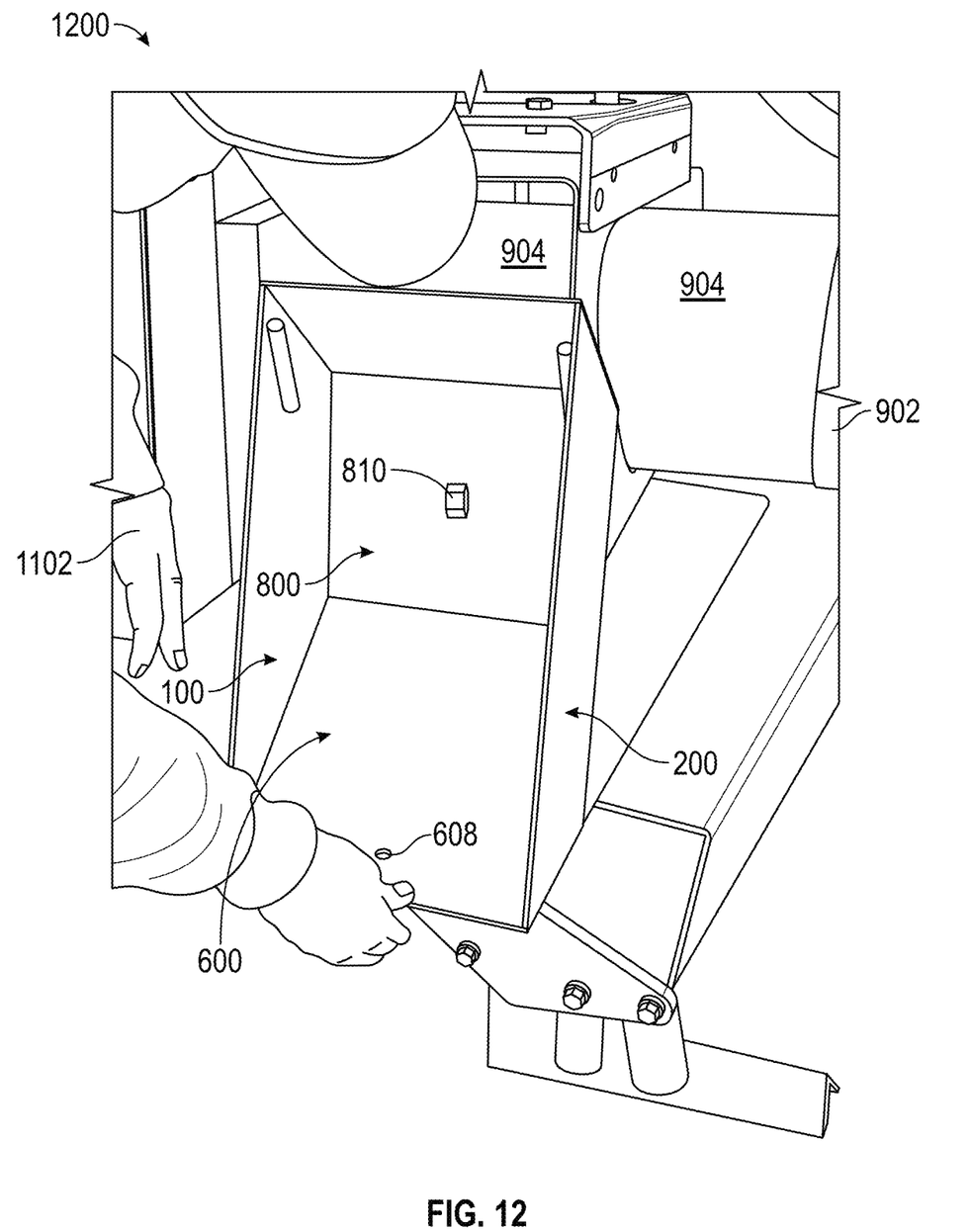
FIG. 12 shows a photographic view of the grain bypass of FIG. 9 in an 'open' position such that grain is no longer allowed to flow freely out of the housing through an opening on the opposite side of the transfer portion.

As shown in FIGS. 10-12, the slide 600 can be removed from the position 900 shown in FIG. 9. To achieve the position 1000 shown in FIG. 10, the slide 600 can be inserted into the bypass opening (that exists between the front, distal edges 108, 208 of the side plates 100, 200) from a lower position. The slide 600 can be slid upward to the position 1100 shown in FIG. 11 until the lower most edge 604 of the slide 600 meets the lower most edge 504 of the angled base plate 500. The slide 600 is long enough so as to completely cutoff access to the transfer portion 1302 when locked into a bypass position 1200 (e.g. when in a position such that locking mechanism 510 can be put through both apertures 508, 608 of the angled base plate 500 and the slide 600, as shown in FIG. 12). In some embodiments, the left- and right-side edges 606 of the slide 600 can be approximately four times the length of the left- and right-side edges 306 of the top plate 306.

Figure 13:
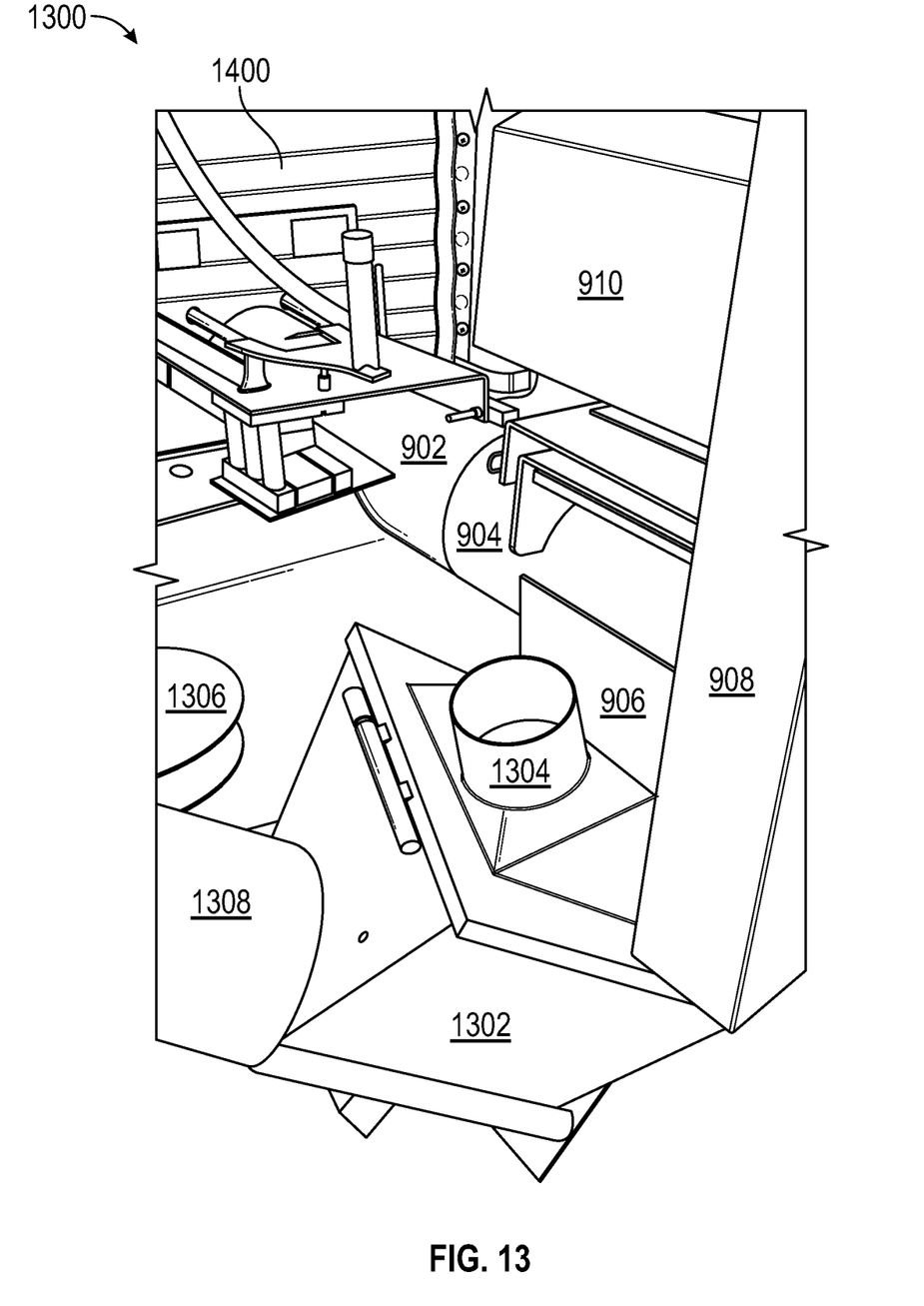
FIG. 13 shows a photographic view of a transfer portion of the grain bypass located on a side opposite the bypass portion of the grain bypass, through which the grain can flow to a portable auger and/or truck for transport.

As shown in FIG. 13, a transfer portion 1302 of the grain bypass housing 906 comprises a viewing window 1304 with a cap 1306. When the slide 600 is in the position shown in FIG. 9 (an operating position), grain is allowed to transfer from the out auger 902 and to the portable auger 1308 through gravity and mechanical diversion of the grain. Thereafter, the grain can be transferred up (at an angle) through the portable auger 1308 by operating same with an electric motor 910. This will cause additional grain to fall into the transfer portion 1302 until the grain is completely depleted. The electric motor 910 can include a shield 908 for the motor's pulleys and belts.

In preferred embodiments, the portion of the housing 906 seen through FIGS. 1-8 is positioned beneath the transfer portion 1306. This feature can be advantageous because it can allow any excess grain trapped in the transfer portion 1306 after operation to be drained from the housing 906 after operation.

Figure 14:
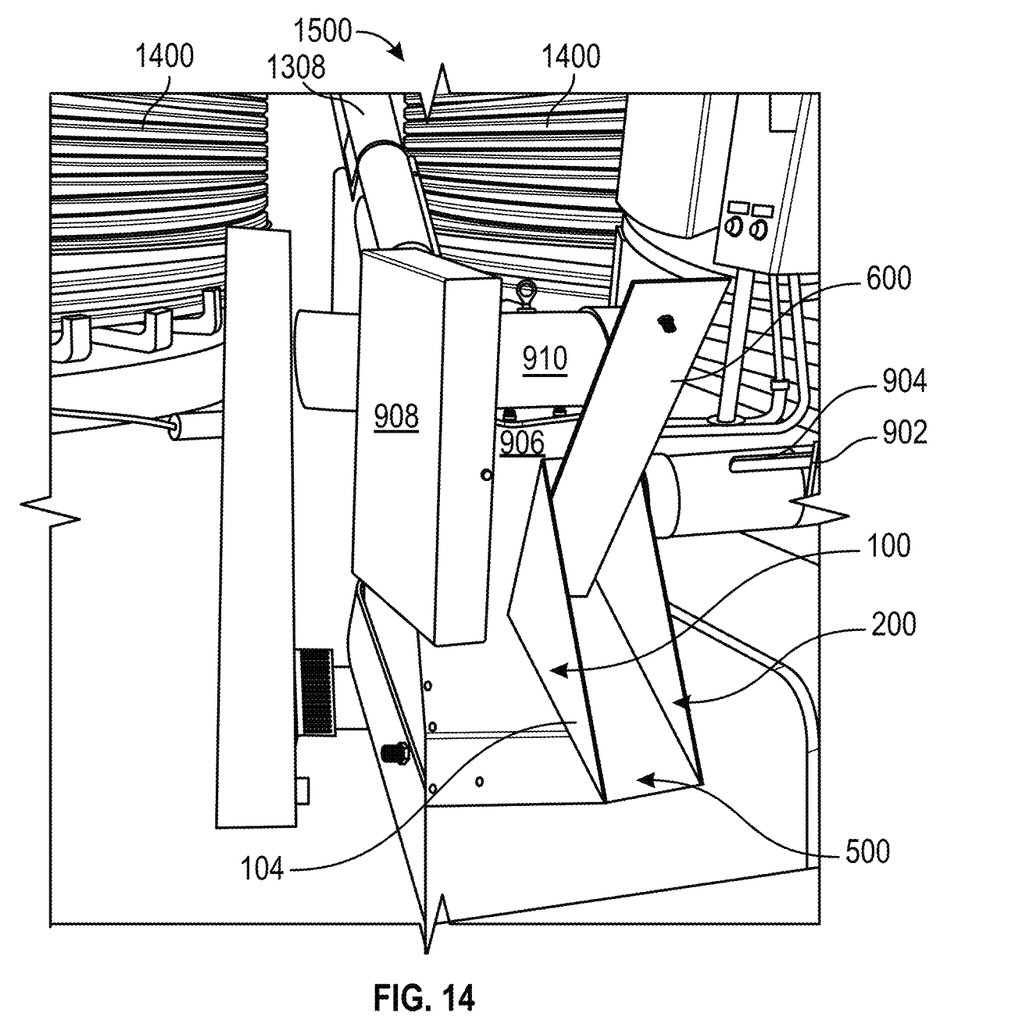
FIG. 14 shows a photographic view of an alternative embodiment of a grain bypass retrofit to a grain bin/out auger of another style and with different dimensions.
Figure 15:
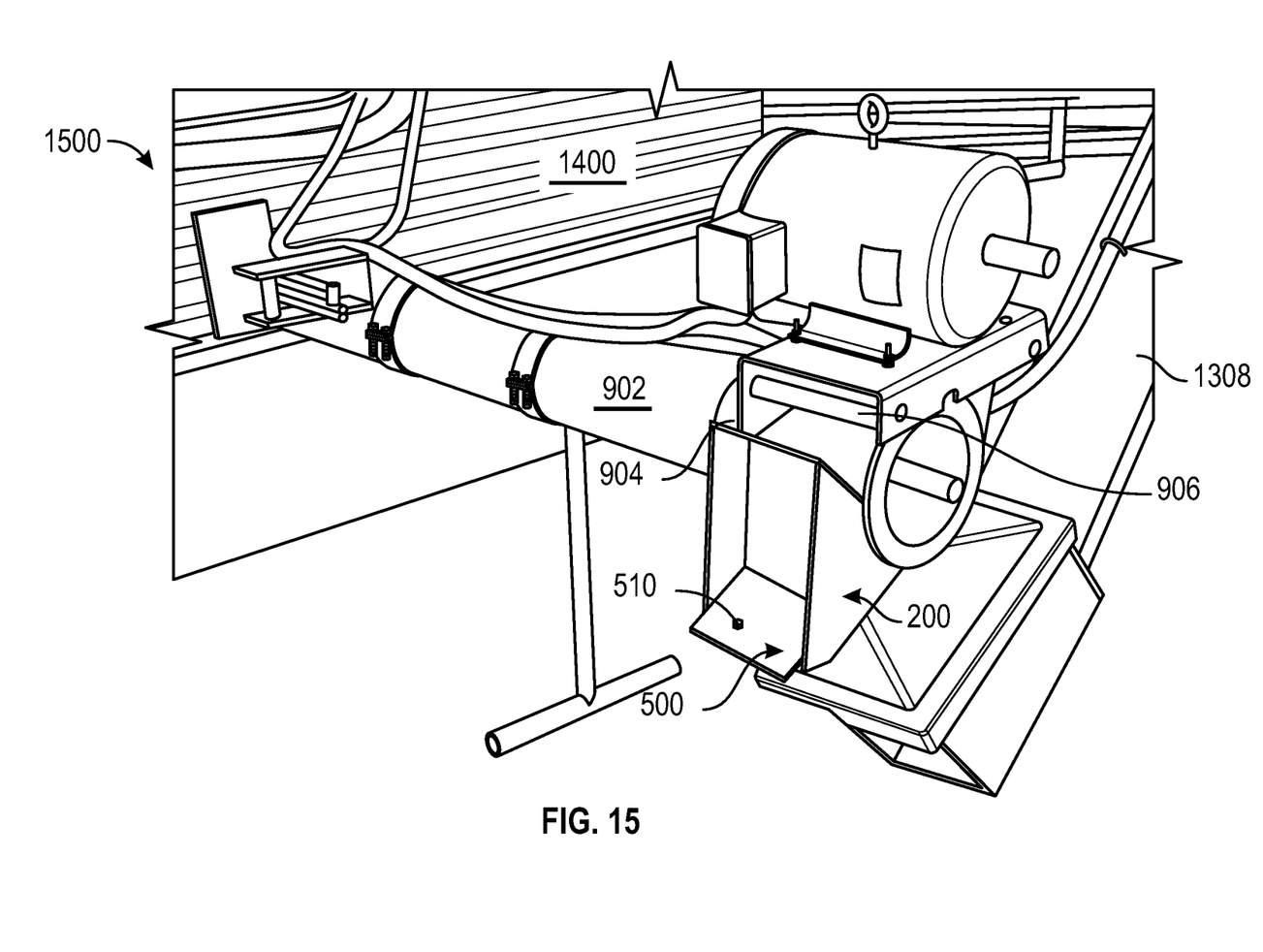
FIG. 15 shows yet another a photographic view of an alternative embodiment of a grain bypass retrofit to a grain bin/out auger of another style and with different dimensions.

As shown in FIGS. 13-15, various environments 1300, 1500 can be seen that emphasize the grain bin 1400 and the grain as it dries/moves through the grain bypass system.

Though drying is not required in locations external to the auger, a blower and/or heating device (e.g. a dryer) can be aid in pushing, pulling, and/or drying grain as in moves from the out auger 902 through the housing 906 and to other end use applications.

Based on the customer's out auger and the arrangement of the grain handling system, (where the dryer is located etc.) measurements of the grain bypass system can vary, but the principles of the aforementioned components shall still apply. Dimensions can be changed as necessary to fit individual needs. For example, dimensions of the corn slide can be altered to fit the size and height of each individual auger coming out of a wet bin 1400. The grain bypass can be adapted and/or sized so as to be usable with grains other than corn that need to be dried. Additionally, cuts can easily be made in one side of the head of the out auger to mount the grain bypass by welding.

The grain bypass system components described herein may comprise any one or a combination of any known rigid materials. The rigid materials, for example, can comprise such as metals and metallic alloys, steel, plastics, composites, wood, stone, glass, and synthetic materials imitating the properties of any of the preceding materials. In some embodiments, flat iron (approximately ten gauge) is used in the construction(s).

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 100 | left-side plate |
| 102 | left-side plate internal surface |
| 104 | left-side plate external surface |
| 106 | left-side plate rear (proximate) edge |
| 108 | left-side plate front (distal) edge |
| 110 | left-side plate upper edge |
| 112 | left-side plate lower edge |
| 114 | left-side plate upper acute angle |
| 116 | left-side plate lower acute angle |
| 118 | left-side plate mounting aperture |
| 120 | left-side plate first guide rod |
| 124 | left-side plate weld |
| 126 | bolt |
| 128 | washer |
| 200 | right-side plate |
| 202 | right-side plate internal surface |
| 204 | right-side plate external surface |
| 206 | right-side plate rear (proximate) edge |
| 208 | right-side plate front (distal) edge |
| 210 | right-side plate upper edge |
| 212 | right-side plate lower edge |
| 214 | right-side plate upper acute angle |
| 216 | right-side plate lower acute angle |
| 218 | right-side plate mounting aperture |
| 220 | right-side plate first guide rod |
| 224 | right-side plate weld |
| 226 | bolt |
| 228 | washer |
| 300 | top plate |
| 302 | top plate contact surface(s) |
| 304 | upper/lower edges of top plate |
| 306 | left- and right-side edges of top plate |
| 400 | collection of rods |
| 402 | first rod |
| 404 | second rod |
| 406 | third rod |
| 500 | angled base plate |
| 502 | angled base plate contact surface(s) |
| 504 | upper/lower edges of angled base plate |
| 506 | left- and right-side edges of angled base plate |
| 508 | locking aperture |
| 510 | locking mechanism |
| 600 | angled base plate |
| 602 | angled base plate contact surface(s) |
| 604 | upper/lower edges of angled base plate |
| 606 | left- and right-side edges of angled base plate |
| 608 | locking aperture |
| 700 | rod with cotter pin |
| 702 | cylindrical body |
| 704 | first rod end |
| 706 | second rod end |
| 708 | cotter |
| 710 | circumferential surface |
| 800 | safety door |
| 802 | door body |
| 804 | pipe |
| 806 | blunt edge of safety door |

TABLE 1-continued

List of Reference Characters

| | |
|---|---|
| 808 | left- and right-side edge of safety door |
| 810 | handle/knob |
| 900 | first, operable position |
| 902 | out auger |
| 904 | receiving portion adapted to receive out auger |
| 906 | grain bypass housing |
| 908 | shield for motor pulleys and belts |
| 910 | electric motor |
| 914 | ground support structures for grain bypass system |
| 1000 | second, cleanout position with slide removed |
| 1100 | second, cleanout position with slide integrated and safety door open |
| 1102 | operator |
| 1200 | second, cleanout position with slide integrated and safety door shut but not locked into a bypass position |
| 1300 | grain bypass environment |
| 1302 | transfer portion |
| 1304 | viewing window |
| 1306 | cap |
| 1308 | portable (incline) auger |
| 1400 | storage bin |
| 1500 | alternative grain bypass environment(s) |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A grain diverter comprising:
   opposing side plates having (i) a trapezoidal shape; and (ii) at least one guide rod welded thereto;
   a top plate connecting the opposing side plates;
   an angled base plate connecting the opposing side plates, said angled base plate opposing the top plate;
   a removable slide that can be inserted into a first position wherein the removable slide rests on the at least one guide rod and into a second position wherein the removable slide substantially overlaps with the angled base plate; and
   a grain inlet for receiving grain at a first height and an opening for discharging grain at a second height, said second height being lower than the first height;
   wherein when the removable slide is in the first position the grain is not allowed to pass through the grain inlet and when the removable slide is in the second position the grain is allowed to pass through the grain inlet so that the grain can be discharged by gravity through the opening.

2. The grain diverter of claim 1 further comprising a biased safety door that closes the opening when grain is not passing therethrough but opens when grain pushes against said door when the removable slide is in the second position.

3. The grain diverter of claim 2 wherein the diverter safety door comprises:
   a body spanning a width from a left-side edge to a right-side edge,
   a pipe located at a top edge of the body, and
   a blunt edge opposite the pipe between said left- and right-side edges.

4. The grain diverter of claim 1 wherein the removable slide forms an acute angle with a horizontal axis parallel with the ground when the removable slide is in the second position.

5. The grain diverter of claim 3 wherein the acute angle is approximately thirty degrees.

6. The grain diverter of claim 1 wherein the at least one guide rod comprises two guide rods welded to each of the opposing side plates.

7. The grain diverter of claim 1 wherein a length of the removable slide is at least four times a length of the top plate.

8. The grain diverter of claim 1 wherein the rods each comprise cylindrical bodies, first and second ends, cotters, and a circumferential surface.

9. The grain diverter of claim 1 wherein the removable slide and the angled base plate comprise corresponding locking apertures.

10. The grain diverter of claim 9 further comprising a locking mechanism that extends the corresponding locking apertures.

11. A grain diverter system comprising:
    a bypass housing comprising:
       a receiving portion for receiving grain from an out auger of a grain bin;
       a diverter portion comprising:
          the grain diverter of claim 1;
       a transport portion oppositely located from the diverter portion, and
       a portable auger and/or transport vehicle fluidly connected to the transport portion for receiving the transport portion of the diverter portion.

12. The grain diverter system of claim 11 further comprising the out auger and the grain bin.

13. The grain diverter system of claim 11 wherein the transfer portion comprises a viewing window for viewing grain within the transfer portion and a cap for closing the viewing window during operation of the grain diverter system.

14. The grain diverter system of claim 11 further comprising ground support structures for stabilizing the grain bypass housing.

* * * * *